Fig. 2-B

Jan. 28, 1969    H. L. CROSWHITE    3,424,033
MULTIPLE RATIO POWER SHIFT TRANSMISSION MECHANISM
Filed July 27, 1967
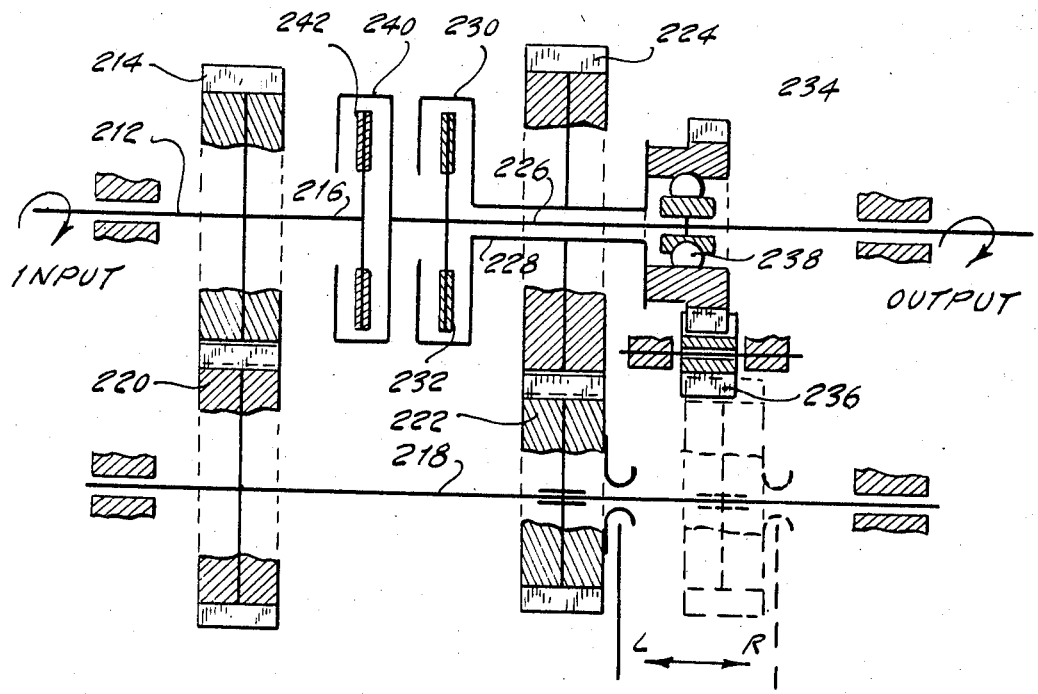
Fig. 4
Fig. 5
| RANGE | CLUTCH-64 | CLUTCH-44 | OWG-56 | FORK |
|---|---|---|---|---|
| REVERSE | ON | OFF | — | R |
| NEUTRAL | OFF | OFF | O'RUN | R |
| LOW | ON | OFF | HOLD | L |
| HIGH | OFF | ON | O'RUN | L |
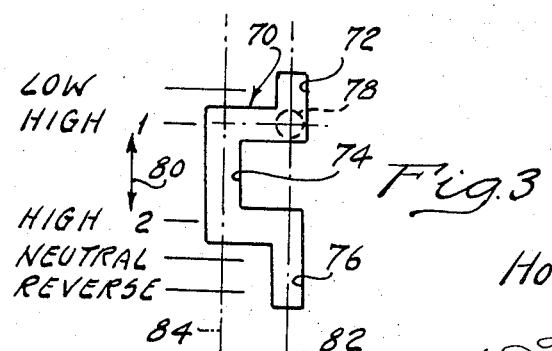
Fig. 3
INVENTOR:
HOWARD L. CROSWHITE
BY
ATTORNEYS.

United States Patent Office 3,424,033
Patented Jan. 28, 1969

3,424,033
MULTIPLE RATIO POWER SHIFT TRANSMISSION MECHANISM
Howard L. Croswhite, Livonia, Mich., assignor to Ford Motor Company, Dearborn, Mich., a corporation of Delaware
Filed July 27, 1967, Ser. No. 656,391
U.S. Cl. 74—730        11 Claims
In. Cl. F16h 47/02

ABSTRACT OF THE DISCLOSURE

This specification describes a multiple-ratio, automotive vehicle power transmission mechanism. The mechanism has two speed ratios and is for use in the driveline of automotive vehicles wherein ratio changes can be obtained without the use of reaction brakes while torque is being delivered through the driveline without interruption.

General summary of the invention

My invention can be applied readily to a driveline for a racing vehicle wherein frequent non-synchronous, smooth ratio changes between two forward driving ratios must be available.

The ratio changes between each of two forward driving speed ratios can be obtained by selectively engaging and disengaging a pair of friction clutches without the necessity for providing reaction brakes. The ratio changes are accomplished by selectively controlling the application and release of the friction clutches which are timed by means of an overrunning coupling situated in parallel disposition with respect to the torque delivery path defined by the friction clutch associated with the lower speed ratio. The torque source in the form of an internal combustion engine is connected to the power input element of the gearing of the transmission mechanism by a hydrokinetic torque converter.

A reverse drive torque delivery path can be established and disestablished by shifting a reverse idler into engagement and out of engagement with one of the torque delivery gears associated with the low speed ratio torque delivery path while torque is continuously delivered through the torque delivery path with the higher speed ratio.

Brief description of the figures of the drawings

FIGURE 4 shows in schematic form an alternate embodiment of my invention in which the power input shaft and the power output shaft are aligned rather than offset as in the case of FIGURES 1, 2A and 2B.

FIGURE 5 is a chart showing the clutch engagement and release pattern for controlling the ratio shifts of the structure schematically illustrated in FIGURE 1.

Particular description of the invention

Figure 1:
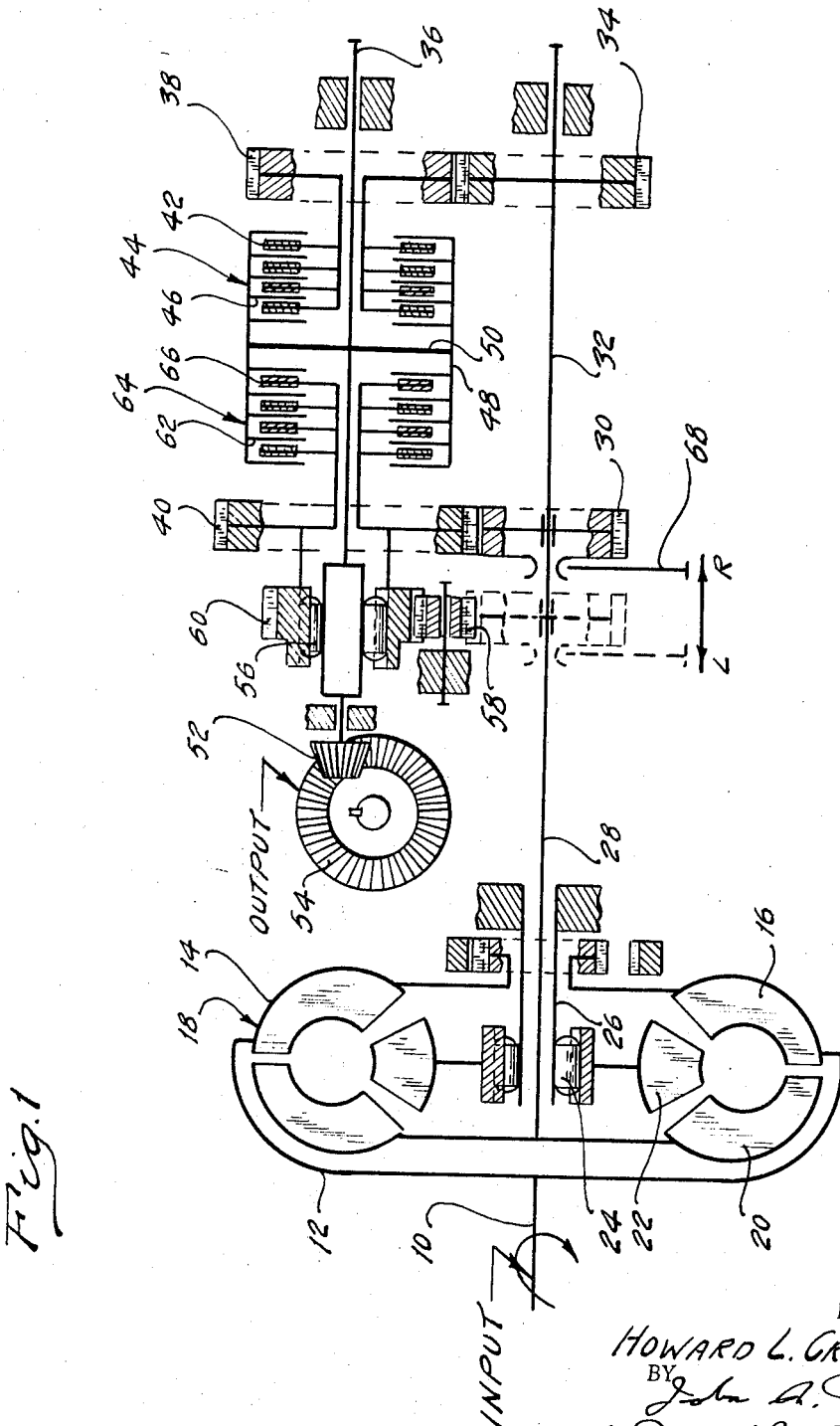
FIGURE 1 shows in schematic form a two-speed power shift transmission with the power input shaft situated transversely with respect to the power output shaft.

In FIGURE 1 numeral 10 designates a power input shaft which may be the crankshaft of an internal combustion engine, not shown. Shaft 10 is connected by a drive plate 12 to the impeller shell 14 of a bladed impeller 16. The impeller forms one member of a hydrokinetic torque converter generally indicated by reference character 18.

The converter includes a bladed turbine 20 situated in toroidal fluid flow relationship with respect to the impeller 16. A bladed reactor 22 is disposed between the fluid flow exit section of the turbine 20 and the flow entrance region of the impeller 16. It is mounted on an overrunning coupling 24 which establishes a one-way connection with a stationary reactor sleeve shaft 26. This shaft is secured to the transmission casing.

Turbine 20 is connected drivably to a turbine shaft 28. Shaft 28 is connected to a low-and-reverse pinion 30 carried by a countershaft 32. A high speed ratio pinion 34 is secured also to countershaft 32. The ends of the countershaft 32 are journaled to bearings formed in the transmission housing.

A power output shaft 36 is situated in parallel disposition with respect to the shaft 32. A power output gear 38, which is journaled rotatably upon the axis of shaft 36, engages continuously pinion 34. Another power output gear 40 is journaled rotatably about the axis of shaft 36 and engages with the pinion 30. Gear 38 is connected drivably to frictional clutch discs 42 which form clutch assembly 44. This assembly includes companion friction discs 46 carried by a clutch drum 48. Drum 48 in turn is connected to shaft 36 by means of a web 50. Shaft 36 is connected to a power output bevel pinion 52 which engages a ring gear 54 of a differential gear assembly. This distributes the torque output to a power output axle situated transversely with respect to the axis of shaft 28. Shaft 36 is connected to gear 40 by means of a one-way clutch 56.

Pinion 30 is splined to shaft 32 to permit axial shifting movement along the shaft 32. When it is positioned as shown, it engages gear 40 to establish low speed ratio operation. When it is shifted, however, it is adapted to engage reverse idler pinion 58. Pinion 58 in turn is engageable with a reverse gear 60 which can form a part of a cluster gear assembly with gear 40.

Clutch drum 48 carries also a second set of friction clutch discs 62. These form a part of a multiple disc clutch assembly 64 which includes also friction clutch discs 66. Gear 40 is connected drivably to the discs 66.

The clutches 64 and 44 can be engaged selectively by fluid pressure operated servos as will be described subsequently with reference to FIGURE 2.

The pinion 30 can be shifted axially with respect to the axis of shaft 32 by a shift fork shown at 68.

Figure 3:
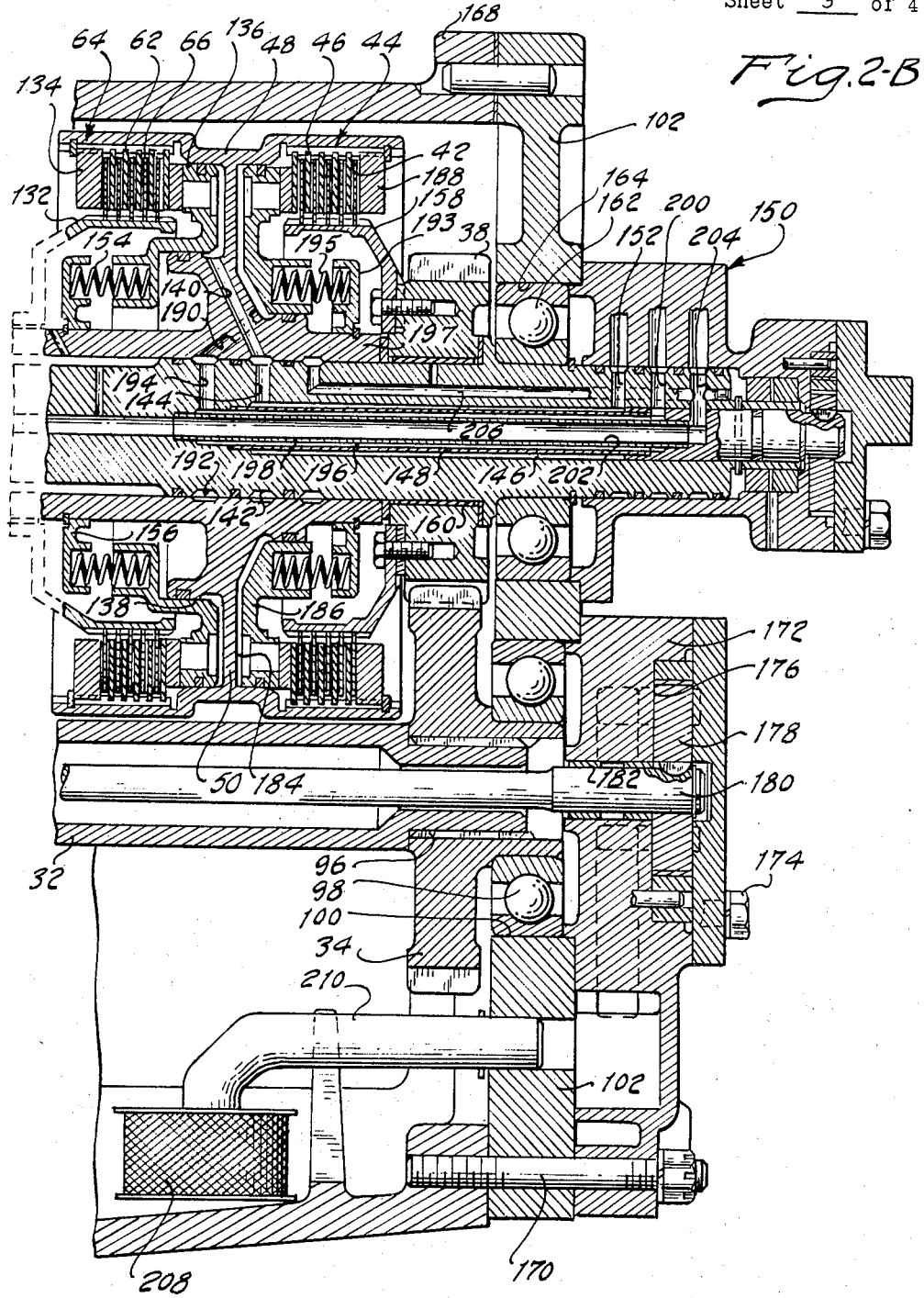
FIGURE 3 shows a gear shift selector pattern which can be used to control the ratio changes in the transmission system of FIGURES 1 and 2.

In FIGURE 3 I have shown schematically the shift pattern. It comprises in part a gate 70 having a first gate portion 72, a second gate portion 74 and a third gate portion 76. A driver-controlled selector lever 78 extends through the gate. In FIGURE 3 the selector lever 78 is shown in gate portion 72.

The lever 78 can be shifted between the two gate portions 72 and 74 and also between the two gate portions 74 and 76. It can be moved in the directions of the double arrow 80 to its various operating positions. These positions are indicated in FIGURE 3 by the legends low, High$_1$, High$_2$, neutral and reverse. When the lever 78 is in the position shown, it can move in a first plane 82 which is common to gate portions 72 and 76. When it is shifted to gate portion 74, lever 78 can be moved in the plane 84, which is parallel to plane 82.

Lever 78 can be connected to a manual control valve, not shown, which distributes pressure selectively to the servos for the clutches 64 and 44. Thus the control valve establishes therethrough communication between the pressure source and each of the clutches. As the lever 78 is adjusted in the plane 82, the manual control valve assumes the various operating positions indicated. The lever 78 can be connected mechanically, however, to the shifter fork 68 when it is shifted to the plane 84. When the lever is adjusted in the plane 84 between the position indicated at legend High₁ and the position indicated by the legend High₂, the pinion 30 is shifted axially from the low speed position to the reverse positon. Thereafter the lever 78 can be returned to plane 82 and shifted between the High₂ position and the reverse position through the neutral position.

To condition the mechanism for forward drive in the low speed ratio, clutch 64 is applied and clutch 44 is released and torque is multiplied by the hydrokinetic torque converter 18 during acceleration. The resulting turbine torque is delivered through shaft 28 by the pinion 30 which drives gear 40. The torque is transferred through gear 40 and through the engaged clutch 64 to the shaft 36. Overrunning clutch 56 at this time establishes a parallel torque delivery path from gear 40 to shaft 36.

During a shift from the low speed ratio to the high speed ratio, clutch 44 is applied and clutch 64 is released. The clutch 64 will be released before the clutch 44 becomes applied. During the interval between release of clutch 64 and the application of clutch 44, torque continues to be delivered to the shaft 36 through the overrunning clutch 56. When clutch 64 becomes fully applied, overrunning clutch 56 begins to overrun. Thus, the ratio shift is non-synchronous. The disengagement of the clutch 64 need not be timed with respect to the application of the clutch 44 since the timing function is accomplished by the overrunning clutch 56.

To obtain a ratio downshift, the manual selector valve can be shifted to cause clutch 64 to become applied while clutch 44 is released. When clutch 44 becomes released, the gear 40 is rotating at a speed that is less than the speed of shaft 36. When the shaft 36 decelerates to an angular velocity equal to the velocity of gear 40, a driving connection is established between gear 40 and shaft 36 through the clutch 56. Following such engagement, the clutch 64 becomes applied. Again the clutch 56 establishes a timing function that makes it unnecessary to establish a timed sequence for the disengagement of clutch 44 and the engagement of clutch 64.

Neutral is achieved by adjusting the manual selector valve to a position that will cause both clutches 64 and 44 to become disengaged.

To obtain reverse drive, the manual selector valve first is shifted to a position that would cause gear 34 to deliver torque to gear 38. At that time the transmission is conditioned for high speed ratio operation with the clutch 64 released as the clutch 44 is applied. It is during this interval that pinion 30 idles. No torque is delivered through pinion 30 or gear 40. Overrunning clutch 56 at that time is freewheeling. Due to this zero torque condition, it is possible to shift the pinion 30 from the position shown in FIGURE 1 into engagement with the reverse drive pinion 58. After the pinion 30 is fully engaged with the reverse drive pinion 58, clutch 64 is applied and clutch 44 is released. Thus there is a mechanical torque delivery path established between shaft 28 and shaft 36. Pinion 34 and gear 38 simply idle during reverse drive.

The foregoing shift sequence is summarized in the chart of FIGURE 5. It is possible, of course, for the manual control valve to be released by an automatic pressure distributor valve that responds to vehicle speed and engine torque. For purposes of this description, however, I have disclosed instead an arrangement that is adapted for manual controls.

Figure 2:
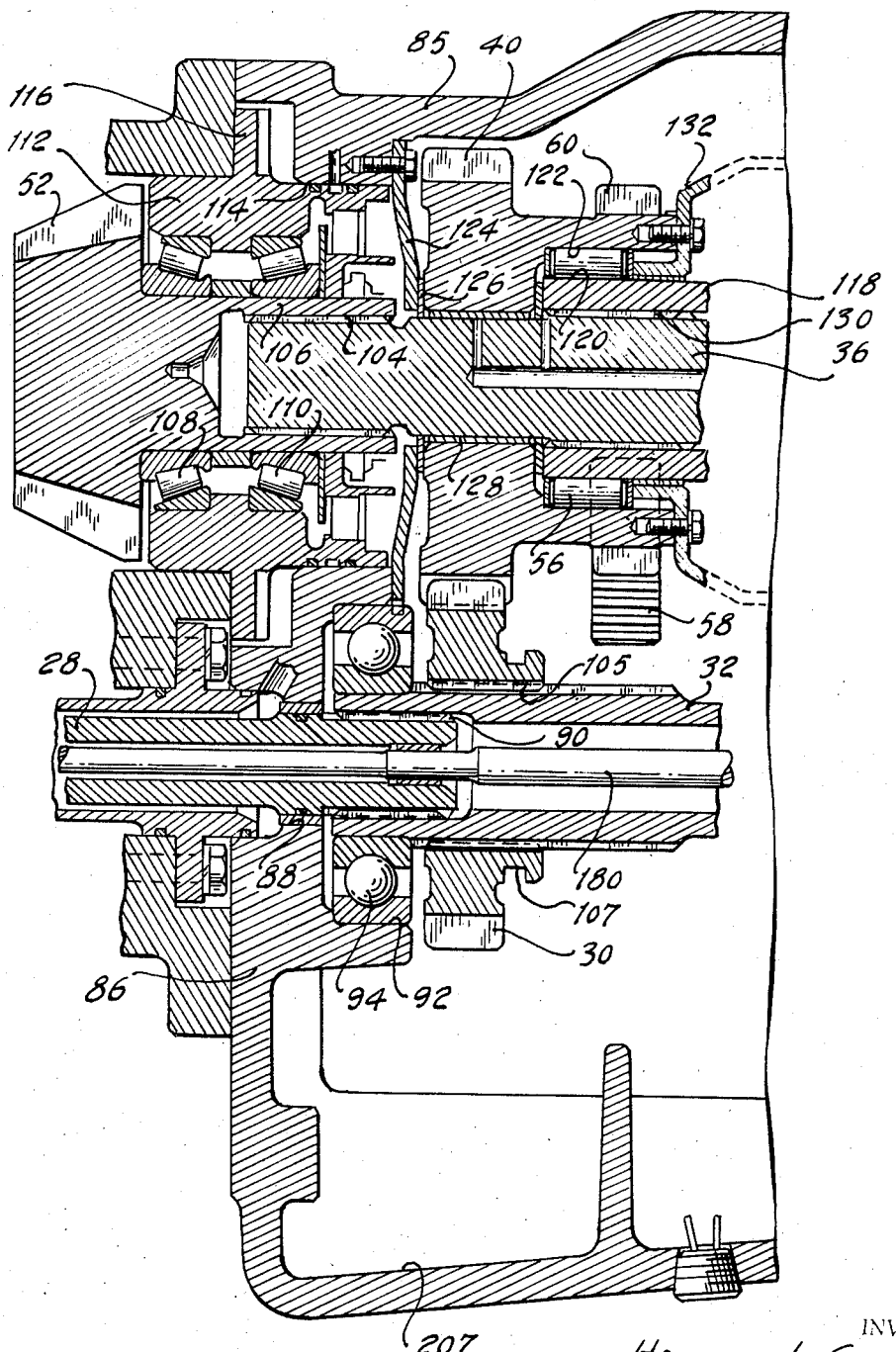
FIGURES 2A and 2B show in longitudinal cross-sectional form a working embodiment of the structure shown schematically in FIGURE 1.

In FIGURES 2A and 2B I have shown an actual working embodiment of the structure schematically illustrated in FIGURE 1. The housing in FIGURE 2 is designated as shown at 85. The forward wall 86 of the housing 85 is formed with an opening 88 through which shaft 28 extends. Shaft 28 is splined at 90 to the left-hand end of shaft 32. A bearing recess 92 formed in the wall 86 receives a ball bearing 94 which journals the left end of the shaft 32. The right-hand end of the shaft 32 is splined at 96 to the gear 34. That gear is formed with a hub which is journaled by means of a ball bearing 98 within a bearing opening 100 formed in end wall 102 of the housing 85.

Pinion 30 is splined to the shaft 32 by means of loose splined teeth 105. The hub of pinion 30 is formed with an annular groove 107 to receive the end of the shifter fork which is described with reference to FIGURE 1. When it is shifted in a right-hand direction, as viewed in FIGURE 2, it engages reverse idler 58. That idler in turn engages gear 60.

Power output shaft 36 is splined at 104 to the hub 106 of power output pinion 52. Axially spaced tapered roller bearings 108 and 110 are journaled in the hub 106 in a bearing adapter 112 which in turn is secured within opening 114 formed in the forward end wall 86 of housing 84. A flange 116 of the adapter 112 permits a connection between the adapter 112 and housing 85.

Gear 40 is journaled upon shaft 36. It is connected to sleeve 118 by means of the overrunning clutch 56.

Clutch 56 consists of rollers located between the inner race surface 120 of sleeve 118 and the outer race surface 122 of gear 40. Surface 122 can be formed with cam recesses to establish a clutch action between shaft 36 and gear 40 during torque delivery in one direction, but freewheeling is permitted in the opposite direction.

A thrust plate 124 is secured at its periphery to an inner shoulder formed in the housing 85. A thrust washer 126 is situated between the plate 124 and the gear 40. Gear 40 is journaled by bushing 128 on the shaft 36.

The sleeve 118 is splined to the shaft 36 as shown at 130. Sleeve 118 is connected directly to the web 50. Gears 40 and 60 are formed as a unit. A clutch member 132 is secured to the right-hand end of the gear unit and it is splined to carry the internally splined clutch discs 66. These cooperate with externally splined clutch discs 62 carried by an internally splined part of the drum 48. A reaction ring 134 is held by the drum 48 adjacent discs 62 and 66. These discs form in part the multiple disc clutch assembly 64.

The discs 60 and 62 can be engaged by means of a fluid pressure operated annular piston 136 which is situated slidably in an annular cylinder 138 formed in the web 50 and in the drum 48. A pressure chamber is defined by the piston 136 in the cylinder 138, and this chamber is in fluid communication with a feed passage 140. An annular groove 142 formed in the shaft 36 communicates with passage 140. A radial passage 144 connects the groove 142 with a central passage 146 formed in the shaft 36. This passage 146 is defined in part by a sleeve insert 148 positioned in the central bore in the shaft 36. Passage 146 communicates with a pressure distributor manifold 150 through a radial passage 152.

A piston return spring 154 urges the piston 136 to a clutch releasing position. Spring 154 is anchored against a spring seat 156 surrounding the sleeve 119.

The discs 42 of the clutch disc assembly 44 are carried by an externally splined clutch member 158. Member 158 is secured to gear 38 which is journaled by bushing 160 on the shaft 36. Shaft 36 is journaled by a bearing 162 in the bearing opening 164 formed in end housing wall 102. Wall 102 is bolted to a peripheral flange 168 on the housing 184 by means of bolts 170.

A pump housing 172 is bolted to the wall 102 by bolts 174. A pump cavity 176 is formed in the body 172. A positive displacement pump rotor 178 is situated in the chamber 176. It is keyed to the end of a pump drive shaft 180 which is journaled by bearings 182 within a central opening formed in the body 172.

Shaft 180 extends concentrically through shaft 32. It is journaled also within the turbine shaft 28 and is connected directly to the engine crankshaft so that the pump of which rotor 178 forms a part will be driven by the engine. This pump forms a pressure source for the fluid pressure operated clutches. Distribution of pressure from the pump to the clutches is controlled by the driver-operated manual control valve, as explained previously.

Annular cylinder 184 is defined by the web 50 and the right-hand portion of the drum 48. An annular clutch servo piston 186 cooperates with the cylinder 184 to define a pressure chamber. As pressure is admitted to the chamber, clutch discs 42 and 46 become frictionally engaged. The force reaction of the piston is taken by a reaction ring 188. A clutch piston return spring 195 acts upon the piston 186 to move it to a clutch disengaging position. The spring seat 193 is carried by the hub 197 of the web 50.

Clutch discs 42 connect to and rotate with gear 38.

The clutch chamber behind the piston 186 is supplied with pressure through feed passage 190 formed in the web 50. This communicates with annular groove 192 formed in the shaft 36. A radial passage 194 connects groove 192 with passage 196 situated within the shaft 36. Passage 196 is defined by a sleeve 148 and a companion sleeve insert 198. Passage 196 is defined by a sleeve 148 and a companion sleeve insert 198. Passage 196 can be connected to the pressure distributor manifold 150 through radial passage 200.

A lubrication oil passage 202 extends through the center of sleeve insert 198 and communicates with manifold 150 through a radial passage 204. Passage 202 communicates with various lubrication points in the transmission. Another lubrication oil passage 206 is formed in the shaft 36 for reaching other lubrication points that cannot be reached by the passage 202.

The lower region of the housing 84 defines an oil-containing sump 207. An oil filter 208 is located in the sump at the intake end of a pump supply passage 210. This passage extends through the wall 102 and communicates with the intake port of the pump shown in part at 178.

In the embodiment of FIGURE 4, the power input shaft and the power output shaft are aligned rather than offset as in the FIGURE 1 embodiment. But unlike the FIGURE 1 embodiment, the high speed ratio in the transmission system shown in FIGURE 4 is a direct drive. Ratio changes from the direct drive to the low speed ratio are accomplished, however, in the same fashion by means of selectively engageable friction clutches and an overrunning coupling used for timing. Also, a shifting of the forward and reverse pinions under zero torque conditions can be achieved in the FIGURE 4 embodiment just as in the case of the FIGURE 1 embodiment.

In FIGURE 4, numeral 212 designates the engine crankshaft of an internal combustion engine. It is connected directly to a power input gear 214 which is connected directly to a transmission input shaft 216. A countershaft 218 is mounted within a transmission housing in parallel disposition with respect to the shaft 216. Fixed to the shaft 278 is a countershaft input gear 220, which meshes directly with the input gear 214. Shaft 218 is connected directly to gear 222 which meshes with low speed ratio gear 224. That gear is mounted for rotation about the axis of output shaft 226. Gear 224 is connected by means of a sleeve 228 to a clutch drum 230 which carries internal clutch discs. External clutch discs 232 are carried by shaft 226 and they register frictionally with the internal clutch discs. Sleeve 228 is connected also drivably to reverse gear 234, which meshes with reverse idler pinion 236. This drivably engages forward and reverse gear 222 as the latter slides along the shaft 218. Gear 222 is connected to shaft 218 by means of a sliding spline. As in the previous embodiment, the gear 222 can be actuated by means of a shifter fork.

Power output shaft 226 is connected to gear 234 by means of an overrunning coupling 238. This connects sleeve 228 to shaft 226 to form a torque delivery path that is parallel to the torque delivery path established by the clutch shown in part at 230. Shaft 226 is connected also to the drum of clutch 240 having clutch discs which cooperate frictionally with clutch discs 242 carried by shaft 216. Both clutches 230 and 240 can be engaged as in the case of the FIGURE 1 embodiment by fluid pressure operated servos.

During low speed ratio operation, engine torque is delivered to gear 214, which drives gear 220. Gear 222 is in the position shown. The torque delivered to gear 220 is transferred to gear 222, which drives gear 224. Clutch 230 is engaged, thus producing a torque delivery path between the output shaft and gear 224. Overrunning clutch 238 is engaged at this time, thus establishing a parallel torque delivery path. A speed ratio change to the high speed ratio is achieved by disengaging clutch 230 and engaging clutch 240. Clutch 230 is disengaged, however, before clutch 240 becomes fully applied. Thus the ratio change occurs with a pick-up shift characteristic which is produced by overrunning coupling 238. Timing of the engagement and disengagement of the friction clutches is not required. A downshift from high speed ratio to the low speed ratio is achieved by disengaging clutch 240 and engaging clutch 230. Clutch 230 is engaged, however, after clutch 240 is released and after gear 224 and the shaft 226 achieve the same angular velocity. Engagement of the clutch 230 thus takes place with no change in momentum. The timing characteristic produced by the overrunning coupling 238 thus smooths the engagement and disengagement of the clutches during ratio shifts.

As in the preferred embodiment, the transmission can be conditioned for reverse drive while the clutch 240 is applied. At this time gears 222 and 224 are relieved of torque. Thus the gear 222 can be shifted into engagement with the reverse idler pinion 236 without difficulty. When the clutch 240 is disengaged and the clutch 230 is engaged, a reverse drive torque delivery path is established with the gear 222 forming a part of the path.

Having described preferred embodiments of my invention, what I claim and desire to secure by U.S. Letters Patent is:

1. In a power transmission mechanism adapted to deliver driving torque from a driving member to a driven member, a first gear and a second gear journaled rotatably about the axis of said driven member, a forward and reverse gear adapted to mesh with said first gear, a reverse gear connected to and rotatable with said first gear, a reverse drive pinion engageable with said reverse gear, an overrunning coupling connection between said first gear and said driven member, a countershaft, a drive pinion carried by said countershaft in meshing engagement with said second gear, said forward and reverse gear being carried by said countershaft and adapted for axial movement therealong whereby said forward and reverse gear is adapted for selective engagement with said first gear and said reverse pinion as it is shifted from one axial position to another, and first and second friction clutch means for connecting selectively said first gear and said second gear to said driven member.

2. In a power transmission mechanism adapted to deliver driving torque from a driving member to a driven member, a first gear and a second gear journaled rotatably about the axis of said driven member, a forward and reverse gear adapted to mesh with said first gear, a reverse gear connected to and rotatable with said first gear, a reverse drive pinion engageable with said reverse gear, an overrunning coupling connection between said first gear and said driven member, a countershaft, a drive pinion carried by said countershaft in meshing engagement with said second gear, said forward and reverse gear being carried by said countershaft and adapted for axial movement therealong whereby said forward and reverse gear is adapted for selective engagement with said first gear and said reverse pinion as it is shifted from one axial position to another, first and second friction clutch means for connecting selectively said first gear and said second gear to said driven member, a torque input shaft, and a hydrokinetic torque converter mechanism adapted to connect drivably said torque input shaft with said driving member.

3. The combination as set forth in claim 1 wherein said countershaft is axially aligned with and connected to said driving member.

4. The combination as set forth in claim 2 wherein said countershaft is axially aligned with and connected to said driving member.

5. The combination as set forth in claim 1 wherein said driving member is axially aligned with said first gear and said second gear, said first clutch means being adapted to connect directly said driving member and said driven member to establish a direct drive connection therebetween when said second clutch means is released.

6. The combination as set forth in claim 2 wherein said driving member is axially aligned with said first gear and said second gear, said first clutch means being adapted to connect directly said driving member and said driven member to establish a direct drive connection therebetween when said second clutch means is released.

7. The combination as set forth in claim 1 wherein said forward and reverse gear is held rotatably fast with respect to said countershaft, and means for shifting said forward and reverse gear along said countershaft from one axial position to another when said second clutch means is engaged and said first clutch means is released, said forward and reverse gear being adapted to shift to a position corresponding to reverse torque delivery when the torque delivery path defined by said forward and reverse gear and by said first gear is inactive, said first clutch means being applied and said second clutch means being released after said forward and reverse gear assumes a reverse drive position whereby a reverse torque delivery path is established.

8. The combination as set forth in claim 2 wherein said forward and reverse gear is held rotatably fast with respect to said countershaft, and means for shifting said forward and reverse gear along said countershaft from one axial position to another when said second clutch means is engaged and said first clutch means is released, said forward and reverse gear being adapted to shift to a position corresponding to reverse torque delivery when the torque delivery path defined by said forward and reverse gear and by said first gear is inactive, said first clutch means being applied and said second clutch means being released after said forward and reverse gear assumes a reverse drive position whereby a reverse torque delivery path is established.

9. The combination as set forth in claim 3 wherein said forward and reverse gear is held rotatably fast with respect to said countershaft, and means for shifting said forward and reverse gear along said countershaft from one axial position to another when said second clutch means is engaged and said first clutch means is released, said forward and reverse gear being adapted to shift to a position corresponding to reverse torque delivery when the torque delivery path defined by said forward and reverse gear and by said first gear is inactive, said first clutch means being applied and said second clutch means being released after said forward and reverse gear assumes a reverse drive position whereby a reverse torque delivery path is established.

10. The combination as set forth in claim 4 wherein said forward and reverse gear is held rotatably fast with respect to said countershaft, and means for shifting said forward and reverse gear along said countershaft from one axial position to another when said second clutch means is engaged and said first clutch means is released, said forward and reverse gear being adapted to shift to a position corresponding to reverse torque delivery when the torque delivery path defined by said forward and reverse gear and by said first gear is inactive, said first clutch means being applied and said second clutch means being released after said forward and reverse gear assumes a reverse drive position whereby a reverse torque delivery path is established.

11. The combination as set forth in claim 5 wherein said forward and reverse gear is held rotatably fast with respect to said countershaft, and means for shifting said forward and reverse gear along said countershaft from one axial position to another when said second clutch means is engaged and said first clutch means is released, said forward and reverse gear being adapted to shift to a position corresponding to reverse torque delivery when the torque delivery path defined by said forward and reverse gear and by said first gear is inactive, said first clutch means being applied and said second clutch means being released after said forward and reverse gear assumes a reverse drive position whereby a reverse torque delivery path is established.

References Cited

UNITED STATES PATENTS

| 2,375,783 | 5/1945 | Gilfillan | 74—368 X |
| 2,532,648 | 12/1950 | Tarlton | 74—368 X |
| 2,572,480 | 10/1951 | Hoffman | 74—333 X |
| 3,238,726 | 3/1966 | Jandasek | 74—730 X |

ARTHUR T. McKEON, *Primary Examiner.*

U.S. Cl. X.R.

74—368